UNITED STATES PATENT OFFICE.

LOUIS NAPOLEON BEAUCHEMIN, OF HANCOCK, MICHIGAN.

COMPOSITION FOR SIDEWALKS.

SPECIFICATION forming part of Letters Patent No. 387,390, dated August 7, 1888.

Application filed November 22, 1887. Serial No. 255,904. (No specimens.)

*To all whom it may concern:*

Be it known that I, LOUIS NAPOLEON BEAUCHEMIN, of Hancock, in the county of Houghton and State of Michigan, have invented a new and Improved Composition for Sidewalks, of which the following is a full, clear, and exact description.

My invention relates to an improved composition for sidewalks and method of laying the same, and has for its object to provide a means whereby a smooth, firm, and durable sidewalk may be produced at a medium cost and which will not be affected to any great extent by changes of temperature.

The composition consists in the following ingredient combined in substantially the proportions stated, as follows, viz: For eleven square yards of sidewalk I employ eighteen gallons of coal-tar, twenty pounds of black pitch, ten pounds of rosin, five gallons of slab-tar, and boil them together until thorougly commingled, and add to the boiling mass fifteen pounds of pulverized limestone. I further employ two shovelfuls of copper-molding stamp-sand, one shovelful of ashes, and three shovelfuls of yellow sand. The sand and ashes are well mixed and sifted and thoroughly heated by placing the same upon a metal platform suspended over a brisk fire. A shovelful is equivalent to about two (2) quarts, by measure.

In further maturing the composition the heated sand and ashes are placed upon a suitable platform in a pile and opened in the center, in which opening the aforesaid boiling mixture is poured, and the sand and ashes and the mixture are worked together in a manner similar to mixing mortar. The composition when thus completely mixed will weigh about nine hundred pounds and will cover from eleven to twelve square yards of surface.

To prepare a foundation for the composition, having previously fixed the necessary grade, I spread about four hundred pounds of soft-coal clinkers upon the earth with a rake or other suitable instrument and saturate the same with boiling coal-tar. The clinkers are laid out about five inches deep and pressed into a substantially solid mass by means of a suitable heavy roller. Over this foundation the mortar-like composition is placed about three inches thick, and the said composition is thereupon fixed by passing over the same a heated roller. The operation is completed by scattering over the surface of the composition red sand and passing over the said surface a heavy roller. Within five days the composition will have become hard enough to admit of traffic thereon.

Having thus described my invention, what I claim as new, and desire to secure by Letters Patent, is—

The improved composition for sidewalks, consisting of the following ingredients in the proportions specified: coal-tar, eighteen gallons; black pitch, twenty pounds; rosin, ten pounds; slab-tar, five gallons; pulverized limestone, fifteen pounds; copper-molding stamp-sand, four quarts; ashes, two quarts; yellow sand, six quarts.

LOUIS NAPOLEON BEAUCHEMIN.

Witnesses:
ALLEN F. REES,
JOSEPH CROZE.